United States Patent [19]

Schwarcz

[11] 4,022,732
[45] May 10, 1977

[54] POLY(AMIDE ACIDS) RELEASE AGENTS FOR PRESSURE-SENSITIVE ADHESIVE TAPES

[75] Inventor: Andor Schwarcz, Niskayuna, N.Y.

[73] Assignee: Nashua Corporation, Nashua, N.H.

[22] Filed: Aug. 25, 1975

[21] Appl. No.: 607,442

Related U.S. Application Data

[60] Continuation of Ser. No. 482,341, June 24, 1974, abandoned, Division of Ser. No. 260,268, June 6, 1972, Pat. No. 3,861,956.

[52] U.S. Cl. .................. 260/29.6 NR; 260/47 CP; 260/49; 260/65; 260/78 TF; 260/857 UN
[51] Int. Cl.² .................................. C08G 73/10
[58] Field of Search ...... 260/47 CP, 49, 65, 78 TF, 260/29.6 NR

[56] References Cited

UNITED STATES PATENTS

| | | | |
|---|---|---|---|
| 2,421,024 | 5/1947 | Frusch | 260/78 |
| 3,303,157 | 2/1967 | Boldebuck et al. | 260/30.4 |

Primary Examiner—Lester L. Lee

Attorney, Agent, or Firm—Kenway & Jenney

[57] ABSTRACT

Release agents for pressure-sensitive adhesive tapes comprise poly(amide acids), e.g., poly(N-fatty alkyl amide-acids) of the following recurring formula:

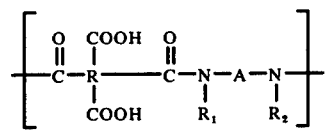

wherein A is a divalent organic radical containing from 2 to 15, preferably 2 to 6, carbon atoms, R is a tetravalent organic radical containing at least 4 carbon atoms, $R_1$ is hydrogen or an alkyl radical containing about 1 to 30 carbon atoms and $R_2$ is an alkyl radical containing about 12 to 30 carbon atoms. When $R_1$ is hydrogen, also provided are the corresponding cyclized imide products and mixtures of the polyamides and polyimides. These poly(amide acids) are formed by the reaction of tetracarboxylic acid dianhydrides and fatty diamines.

14 Claims, No Drawings

POLY(AMIDE ACIDS) RELEASE AGENTS FOR PRESSURE-SENSITIVE ADHESIVE TAPES

This is a continuation of application Ser. No. 482,341 filed June 17, 1974 now abandoned which is a division of application Ser. No. 260,268 filed on June 6 now U.S. Pat. No. 3,861,956.

BACKGROUND OF THE INVENTION

1. Field of the Invention

This invention relates to novel poly(amide acid) and poly(imide acid) compositions and mixtures thereof useful as release agents for pressure-sensitive adhesive tapes.

2. Description of the Prior Art

Various polyamide and polyimide resins are described in the prior art, including a large class of nylon type resins prepared from aliphatic dicarboxylic acids and aliphatic diamines. There is also a large class of so-called linear polyamides and polyimides which are formed by the reaction of polycarboxylic acids and anhydrides and polyprimary amines. Compounds of this latter type are usually prepared by the reaction of tetracarboxylic acid dianhydrides and primary polyamides and products of this type are disclosed, for example in U.S. Pat. Nos. 3,094,511, 3,154,524, 3,179,614, 3,502,762 and in the textbook entitled "New Linear Polymers" by Lee et al, published by McGraw Hill (1968). These linear or "wholly aromatic" polymers have been found useful in a wide variety of areas including use as a backing member for pressure-sensitive adhesive tapes.

With respect to this specific prior art, U.S. Pat. No. 3,154,524 relates to polyamide resins of this general class produced by the reaction of polyamines and aromatic polycarboxylic acids obtained from certain solvent extracts. These products are said to be particularly useful in protective coatings, structural plastics and the like. In U.S. Pat. No. 3,502,762 polyimide films are provided by the reaction of carboxylic acid dianhydrides and unsubstituted organic polyamines which products are said to be useful, for example as a backing member for normally tacky pressure-sensitive adhesive tapes.

Release coating agents for pressure-sensitive adhesive tapes are, in general, used to prevent, or at least reduce, the transfer of the adhesive mass during unwind from a roll thereof, to the backing member, and to control the unwind tension. A release coat provides suitable release properties only if it is less adherent to the adhesive mass than is the backing member itself. However, the release coat must have sufficient adhesion to the backing member to prevent "pick-off" thereof by the adhesive mass. And, it must have a suitable amount of adhesion to the adhesive mass otherwise it will unwind too readily when in roll form. Thus, it is seen that a release coating to be suitable must involve a balancing of various desired characteristics. It has been found, however, that with some release agents, although initially good release characteristics are provided; after extended contact with an adhesive mass, particularly at elevated temperatures, undesirable side effects are noted. Thus, the adhesion between the release coat and adhesive mass may be so great as to make unwinding very difficult, if not impossible. Various other disadvantages associated with the use of release agents now known to the prior art are also known.

The present invention provides a pressure-sensitive adhesive tape comprising a novel release coating which is neither disclosed nor suggested in any of the above-identified references or any other references of which Applicant is aware. This novel class of release agents, as disclosed hereinafter, provides a pressure-sensitive adhesive tape which unwinds easily after storage even in a warm environment, and the adhesive exhibits substantially unimpaired tack and adhesion.

SUMMARY OF THE INVENTION

It is accordingly one object of this invention to provide a novel class of release agents for pressure-sensitive adhesive tapes.

A further object of the invention is to provide a novel class of polyamide and polyimide acid compositions formed by the reaction of tetracarboxylic acid anhydrides and substituted fatty diamine compounds.

A still further object of the invention is to provide a pressure-sensitive adhesive tape product comprising a backing member, a pressure-sensitive adhesive and as release agents, therefor, a new class of polyamide and polyimide acid compositions, and mixtures thereof, formed by the reaction of certain tetracarboxylic acid dianhydrides and fatty diamines.

Other objects and advantages of the present invention will become apparent as the description thereof proceeds.

In satisfaction of the foregoing objects and advantages, there is provided a novel class of polymeric release agents for pressure-sensitive adhesive tapes, the poly(amide acids) of which may be described by the following general recurring repeating unit:

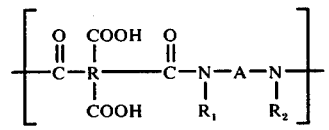

wherein A is a divalent organic radical having from 2 to 15, preferably 2 to 6, carbon atoms, R is a tetravalent organic radical having at least 4 carbon atoms, $R_1$ is hydrogen or an alkyl radical containing about 1 to 30 carbon atoms, and $R_2$ is an alkyl radical containing about 12 to 30 carbon atoms, said polymers having an intrinsic viscosity of more than about 0.04. Also provided are the resulting poly(imide acids) by cyclization of the poly(amide acids), and mixtures of poly(amide acids) and poly(imide acids) as well as methods for the preparation of the novel polymeric products by the reaction of fatty diamines and tetracarboxylic acid dianhydrides. Further, there are provided novel pressure-sensitive adhesive tapes containing these products on the backing member thereof as release agents.

DESCRIPTION OF THE PREFERRED EMBODIMENTS

As pointed out above, this invention is concerned with a novel class of polyamide and polyimide acid compositions which have found to be useful as good release agents for pressure-sensitive tapes. As indicated, the polyamide acid polymers are best defined by the following repeating unit:

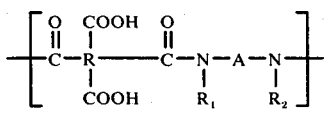

wherein R, A, R₁ and R₂ are as defined above. The invention is also concerned with the corresponding cyclic polyimide acid compositions which may be described by the following repeating unit:

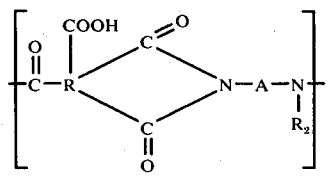

wherein R, A, and R₂ are as defined above. Mixtures of polymers of the polyamide (formula I) and polyimide (formula II) are also included.

The poly(imide acids) of formula II result when R₁ is hydrogen and the reaction is conducted under such conditions of heat that water is evolved from the molecule of formula I so that crystalization occurs. Obviously, as the heating conditions become more severe, the greater the amount of polyimide is formed. Accordingly, the invention as defined herein covers the polyamides of formula I, the polyimides of formula II, mixtures thereof and specific products falling within generic formulae:

These novel polymeric products are prepared by the reaction of tetracarboxylic acid dianhydrides and N-fatty diamines by reacting in approximately stoichiometric equivalent mixtures with or without a solvent and at temperatures ranging up to 200° C. The tetracarboxylic acid dianhydrides which may be used as starting materials are of the formula:

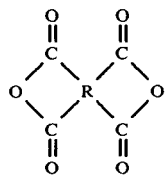

wherein R is an organic tetravalent radical containing 4–30, preferably 4–20, carbon atoms and wherein the four carbonyl groups are attached to separate carbon atoms and each pair of carbonyl groups are directly attached to adjacent nuclear carbon atoms. In this formula, R is a tetravalent organic radical selected from the group consisting of aromatic, aliphatic cycloaliphatic or heterocyclic, combinations of aromatic and aliphatic, and substituted groups thereof. Illustrative of suitable dianhydrides of this general class which may be used include the following:

3,3',4,4'-Benzophenonetetracarboxylic dianhydride
1,2,3,4-Cyclopentanetetracarboxylic dianhydride
1,2,4,5-Benzenetetracarboxylic dianhydride Tetrahydrofuran-2,3,4,5-tetracarboxylic dianhydride
1,4,5,8-Naphthalenetetracarboxylic dianhydride
3,4,9,10-Perylenetetracarboxylic dianhydride 4,4'-(2-Acetoxy-1,3-glyceryl bisanhydrotrimelliate)
Other dianhydrides which may be used include:

Pyromellitic dianhydride
2,3,6,7-Naphthalene tetracarboxylic dianhydride
3,3',4,4'-Diphenyl tetracarboxylic dianhydride
1,2,5,6-Naphthalene tetracarboxylic dianhydride
2,2',3,3'-Diphenyl tetracarboxylic dianhydride
2,2-Bis(3,4-dicarboxyphenyl)propane dianhydride
3,4-Dicarboxyphenyl sulfone dianhydride
2,3,4,5-Pyrrolidine tetracarboxylic dianhydride
Bis(3,4-dicarboxyphenyl)ether dianhydride
Ethylene tetracarboxylic dianhydride, and the like.

These several dianhydrides, as well as others which may be used, are well known in the art, for example, from the prior patents mentioned above.

In the invention, these tetracarboxylic dianhydrides are reacted with a fatty diamine of the formula:

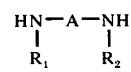

wherein R₁ is hydrogen or a fatty alkyl radical of about 1 to 30 carbon atoms, R₂ is an alkyl radical of about 12 to 30 carbon atoms and A is a divalent radical having from 2 to 15, preferably 2 to 6, carbon atoms, the amino groups being attached to separate carbon atoms. The divalent radical A may be selected from the following groups:
aromatic
aliphatic
cycloaliphatic
combinations of aromatic and aliphatic
bridged organic radicals wherein the bridge is oxygen, nitrogen or sulfur, silicon and phosphorus and substituted groups thereby.

The most preferred diamines, however, are the aliphatic diamines wherein A is a divalent aliphatic radical having 2 to about 6 carbon atoms, for example, wherein A is ethylene, propylene, butylene, pentylene and hexylene. Straight or branched chained aliphatic groups as well as substituted derivatives are also within the scope of the invention. Highly preferred radicals as the fatty R₁ and R₂ groups include palmityl, stearyl, docsanyl or behenyl, and the like as well as any combination thereof. In general, however, it may be said that the alkyl groups of R₁ and R₂ may be any alkyl radical having a straight chain and which contains, in the case of R₁, between 1 and 30 carbon atoms and, in the case of R₂, between 12 and 30 carbon atoms. The following diamines represent highly preferred reactants for forming the compositions of this invention.

N-docosanyl-1,3-propylene diamine
N-stearyl-1,3-propylene diamine
N-stearyl-1,2-ethylene diamine
N-stearyl-N'-methyl-1,2-ethylene diamine
N-stearyl trimethylene diamine
N-stearyl-1,3-hexylene diamine
N-behenyl trimethylene diamine
N,N-distearyl-1,3-propylene diamine As mentioned briefly above, these novel compositions are prepared by contacting approximately stoichiometric equivalent mixtures, or up to about 5–10 mole percent excess of either reactant, of the tetracarboxylic acid dianhydride and the fatty diamine, with or without a solvent, for sufficient time to complete the polymerization. It is preferred that the reaction be conducted by dissolving each of the reactants in an inert organic solvent which is a solvent for at least one reactant but preferably both reactants and does not contain functional groups which cannot enter into the reaction. Organic solvents which may be used are the aromatic hydrocarbon organic solvents including toluene, the isomeric xylenes and benzene; the N,N-dialkyl amides such as N,N-dimethylformamide, N,N-dimethylacetamide, etc. Other solvents which may be used include dimethyl sulfoxide, formamide and the like. Combinations or mixtures of solvents may also be used.

The reaction is generally conducted at an elevated temperature but preferably at a temperature ranging from 20° C. to about 200° C. and at atmospheric pressure although subatmospheric or superatmospheric pressure may be used. As pointed out above, however, the temperatures of the reaction has a bearing on the final product obtained when $R_1$ is hydrogen. Thus, the maximum permissible temperature will depend on the diamine used, the dianhydride used, the particular solvent, the percentage of polyamide acid desired in the final composition when $R_1$ is hydrogen and the minimum period of time desired for the reaction. For most combinations of diamines and dianhydrides falling within the definitions given above, it is possible to form compositions of about 100% polyamide acid by conducting the reaction below about 75° C. However, temperatures up to 200° C. may be tolerated. Quite obviously, when $R_1$ is hydrogen, the higher the temperature used the greater the amount of water eliminated in the reaction with the formation of more polyimide of formula II in accordance with the equation:

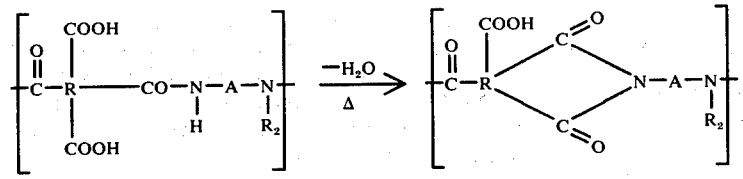

wherein R, A and $R_2$ are as previously defined. When $R_1$ is hydrogen and the polyimide of formula II is desired, operation at a temperature of about 90°–100° C. is preferable.

When $R_1$ and $R_2$ in this reaction are both alkyl radicals, no cyclization can occur and the product is 100% of the poly(amide acid) of formula I.

The final polymerized products resulting from this reaction may be described as having an intrinsic viscosity of more than about 0.04 and preferably more than about 0.05 up to 0.07 as measured in tetrahydrofuran at 30° C.

In practicing the invention a preferred process involves premixing equimolar amounts of the diamine and the dianhydride as dry solids and then adding the mixture, in small portions and with agitation, to the organic solvent. Premixing the ingredients and then adding them in small portions to the solvent provides relatively simple means for controlling the temperature and the rate of the process. The reaction of exothermic and tends to accelerate very rapidly. It is important to regulate the additions to maintain the reaction temperature below the predetermined value. However, the order of addition may be varied within the scope of the present invention. After premixing the diamine and the dianhydride, the solvent may be added to the mixture with agitation. It is also possible to dissolve the diamine in the organic solvent, while agitating and preheating the solution to an elevated temperature below or at the predetermined maximum, and then to add the dianhydride at a rate sufficient to control the ultimate maximum reaction temperature. Ordinarily, in this latter process the last portion of the dianhydride is added with part of the organic solvent. Another possible method involves adding the reactants to the solvent in small portions, not as a premixture, but alternately; first diamine, then dianhydride, then diamine, etc. In any event, it is advisable to agitate the solution polymerization system after the additions are completed until maximum viscosity denoting maximum polymerization is obtained. Another preferred process comprises dissolving the diamine reagent in one portion of a solvent and the dianhydride reagent in a second portion of the same or another solvent, and mixing the two solutions.

The degree of polymerization of the poly(amide acid) is subject to deliberate control. The use of equal molar amounts of the reactants under the prescribed conditions provides poly(amide acids) of very high molecular weight. The use of either reactant in large excess limits the extent of polymerization. However, the scope of the present process encompasses the use of up to 5–10 mole percent excess of either the diamine or the dianhydride. More than 10% excess of either reactant results in an undesirably low molecular weight product. As pointed out above, the polymeric compositions of this invention have been found to be extremely useful as release agents for pressure-sensitive adhesive tapes. Thus, a further aspect of the invention comprises a pressure-sensitive adhesive material which includes a pressure-sensitive adhesive on one side of a backing member and the novel release coating agents hereinbefore described on the other side. There may optionally be included a primer coating on the front side or surface of the backing material in order to improve its surface bonding characteristics to the pressure-sensitive adhesive which is applied thereon. Also, a base coat may be included on the other surface of the backing member in order to improve the bonding characteristics of that surface to the release coating composition applied thereon. The invention is also inclusive of rolls of pressure-sensitive adhesive tape of suitable width and length converted from the adhesive material.

The pressure-sensitive adhesive comprises any elastomeric material such as natural or synthetic rubber, examples of which include polyisobutylene, polybutadiene, polychlorisoprene, polyisoprene and ethylene-propylene polymers, polyvinyl $C_1$–$C_4$ ethers, copolymers of butadiene and acrylonitrile, butadiene and styrene, polyacrylates, and other synthetic and natural rubbers or elastomers. The elastomers described may be used separately or in combination. The adhesive composition may also include resinous components known as tackifying agents. These tackifying agents are usually added in order to provide adherence to surfaces to which the tapes is applied without application of appreciable pressure. Examples of tackifying agents include polyterpene resins, hydrocarbon resins, polymerized or disproportionated rosin esters, wood rosin, oil soluble phenolic resins and the like.

Other components of the pressure-sensitive adhesive include fillers, examples of which are clays, diatomaceous earth, silica, talc, zinc oxide, calcium carbonate, etc.; antioxidants, as for example, polyhydric phenols and their alkyl derivatives, diaryl amines, metal chelating agents, etc; and plasticizers such as mineral oil, lanolin, liquid polybutenes or polyacrylates.

Optionally, primers which improve the bonding characteristics of certain backing material surfaces for better adhesion of the pressure-sensitive adhesive thereto, may be used. These include natural and synthetic elastomers which can be applied in solution or in latex form. Also, the optional base coat for the other surface of the backing member includes both thermoplastic and thermosetting coating resins such as alkyds, vinyls, acrylica, etc.

The pressure-sensitive adhesive is preferably applied to the backing member, which may or may not have a primer coating thereon, in the form of a solvent solution or emulsion. However, it may also be applied as a hot-melting adhesive. The solvent may be any solvent for the particular pressure-sensitive adhesive, including aromatics such as benzene, toluene and xylene, aliphatics such as low boiling naphthas, hexane, pentane and the like, ketones such as methyl ethyl ketone and methyl isobutyl ketone, and chlorinated hydrocarbons such as chlorobenzene, trichloroethylene, ethylene dichloride, and carbontetrachloride. Alcohols and water or other polar solvents may be used when applicable as a solvent or emulsifying medium for the adhesive.

The pressure-sensitive adhesive is generally prepared by dissolving the elastomeric material in a solvent, or dispersing it in an emulsifying solution. To the adhesive mixture may be added the various additives, as for example, the tackifying agent, plasticizer, antioxidant and filler. The components are blended in the solvent or emulsified until smooth. Heat may be required to achieve a uniform solution or dispersion.

The adhesive composition is applied to the backing material (which may first have been coated with a primer coating), by a convenient method, as by calendering, extrusion, kiss roll, coating, etc. The solvent or emulsifying liquid, where the composition contains these, is removed from the adhesive composition by evaporation by heating. The adhesive material is then generally wound on itself for storage and for slitting into rolls of suitable width and length.

The weight of pressure-sensitive adhesive composition (on a dry basis) is preferred to be in the range of between about 0.5–4.0 ounces per square yard of backing member, but may be outside this range if required for specific purposes. The thickness of the backing member is usually greater than 0.5 mils.

Application of the polymeric polyamide and/or polyimide release agents to the surface of the backing member may be by dissolving the polymeric material in a solvent or dispersing it in a carrier and applying this composition to the backing material by means of roll coating or the like. For convenience of handling, a 1%–5% weight solution is preferred. The solvent or carrier is removed by evaporation thus leaving a thin film or residue of release agent on the backing member.

As to the backing member, any material oridinarily used for this purpose may be used with the particular material chosen dependent on the end use for the adhesive tape. Examples of suitable backing materials include fibrous and nonfibrous materials which may be made by weaving, compounding, extruding, etc., as for example, backing materials such as paper, cotton and other cellulosic materials, plastics such as acetates, vinyl halides, polyalkylene and polyester films, glass fabrics, metal foils, etc.

The preferred solvents for all of the release agents of this invention are the aromatic hydrocarbons toluene and xylene because their vapor pressure ranges are particularly adaptable to the manufacture of pressure-sensitive adhesive tapes. Benzene can be used, but it is somewhat too volatile and solutions of the release agents in benzene evaporate too rapidly and may, at high temperatures, cause difficulty in obtaining a uniform distribution of the release agent on the backing material. It is preferred to add a small amount of dimethyl formamide, dimethyl sulfoxide, or a lower alcohol to the release composition. The amount added may be from ½–20% of the total solvent weight. Other solvents which may be used include tetrahydrofuran, butyl acetate and dioxane.

Since the imidization reaction is catalyzed by heat, when $R_1$ is hydrogen, cyclization of the amide structure to the imide structure will occur at least to some extent during preparation of the release agent, especially at temperatures above 50° C., and also during drying of the backsize or release composition which is usually at temperatures greater than 50° C. The extent of imidization or cyclization in the release composition in general depends on the heat history of the release agent. However, ring closure, i.e., imidization may also be affected by treating the intermediate polyamic acid with a carboxylic acid anhydride such as acetic anhydride and benzoic anhydride in the presence of a tertiary amine such as N-ethyl morpholine and pyridine. The combination of this treatment followed by heating can sometimes be advantageously used.

The invention will be further illustrated and described by reference to the following specific examples. The proportions here and elsewhere are expressed as parts by weight unless specifically stated to the contrary.

EXAMPLE I

N-behenyl trimethylenediamine, 20.5 grams (0.05 mol) was dissolved in 200 ml toluene. Then 3,3',4,4'-benzophenone tetracarboxylic dianydride, 16.1 grams (0.05 mol), was added to the solution and refluxed for two hours. Infrared spectra of a sample taken showed complete reaction. The product was precipitated in 1.5 liters of methanol, filtered, washed with methanol and dried in a vacuum oven at room temperature. Yield: 32.1 grams (87.6%), transistion points by differential thermal analysis (DTA): 176° C. and 67° C., intrinsic viscosity in tetrahydrofuran: 0.067.

A 1 mil thick Mylar A poly(ethyleneteraphthalate), film was backsized with a 1% toluene solution of the polymer, using a 1 inch diameter bar tightly wound with a 5 mil thick wire. The solvent was evaporated in a forced air oven at 200° F. By using this same technique the uncoated side of the film was then primed with a 10% toluene-acetone (6:1) solution of the following composition:

| | |
|---|---|
| Nitrile Rubber | 100 parts by weight |
| Chloroprene | 40 parts by weight |
| Zinc Resinate | 60 parts by weight |

The primed side was then coated with a 32% dispersion in toluene of a pressure-sensitive adhesive, at 1.2 ounces (dry) per square yard, of the following composition, using a reverse roll technique and driving the solvent off at 240° F.:

|  | Parts by Weight |
| --- | --- |
| Natural Rubber | 25 |
| Polyisoprene | 50 |
| Styrene-Butadiene Rubber | 25 |
| Zinc Oxide | 50 |
| Petroleum Hydrocarbon Resin | 70 |
| Dehydroabietic Acid | 10 |
| Alkylated Phenolic Resin | 7 |
| Oil Plasticizer | 40 |
| Antioxidant | 2 |

The adhesive material was then wound upon itself (60 yards) and slit into rolls 1 inch wide. Prior to testing, the rolls were submitted to accelerated aging as follows:

Temperature Aging (TA): —Forced air oven at 150° F. for 16 hours.

cycle Aging: —TA-72° F., 50 % R.H. for 24 hours, + oven at 150° F., 85% relative humidity, oxygen atmosphere, 20 inch mercury pressure, 2.5 hours.

Physical testing of the aged rolls yielded the following results:

|  | Aging Conditions | Back-sized | Not Backsized |
| --- | --- | --- | --- |
| Unwind Adhesion[a], lbs/in | Cycle | 0.8 | 5.9 |
| Unwind Adhesion[a], lbs/in | Shelf, 1 wk. | 0.7 | 5.0 |
| Unwind Adhesion[a], lbs/in | Shelf, 6 mos. | 0.7 | 6.2 |
| Adhesion to Stainless Steel[b], oz/in | TA | 44 | 43 |
| Quickstick to Stainless Steel[c], oz/in | TA | 22 | 19 |

[a]Pressure - Sensitive Tape Council Test, PSTC-8. The force required to remove the tape from the roll at 150 ft/min.
[b]PSTC-1 - 180° angle peel.
[c]PSTC-5 - The force resisting peeling of a tape at a 90° angle from a standard surface upon which it has been applied under no other pressure than the weight of the tape itself.

EXAMPLE II

N-behenyl trimethylenediamine, 20.5 grams (0.05 mol), dissolved in 150 ml toluene, was added dropwise at room temperature to a stirring solution of cyclopentane tetracarboxylic acid dianhydride, 10.5 grams dissolved in 50 ml N,N-dimethylformamide. After stirring for 16 hours at room temperature, the poly(amide acid) product was precipitated in 1 liter of methanol, filtered, washed with methanol and dried at room temperature under vacuum. Yield 25.7 (83%), softening point 165°–172° C., intrinsic viscosity in tetrahydrofuran: 0.049.

Rolls of pressure-sensitive adhesive tapes were prepared the same way as described in Example I, except for the release agent, which was, in this case, prepared with the cyclopentane tetracarboxylic dianhydride. The following unwind adhesion results were obtained:

| 1 week shelf aging: | 0.6 lbs./in. |
| --- | --- |
| Cycle Aging: | 0.5 lbs./in. |
| 9 months shelf aging: | 0.5 lbs./in. |

EXAMPLE III

N-Behenyl trimethylenediamine, 20.5 grams (0.05 mol), was added to 3,3′,4,4′-benzophenone tetracarboxylic dianhydride, 16.1 grams, (0.05 mol), dissolved in the solvent mixture of 150 ml N,N′-dimethyl formamide and 30 ml toluene. Infrared analysis taken after 16 hours stirring showed complete reaction, by the disappearance of the 1780 cm$^{-1}$ band chracteristic of anhydrides and the appearance of strong bands at 1600–1660 cm$^{-1}$ and 1720 cm$^{-1}$ characteristic of amides and carboxylic acid, consecutively. The solute was isolated by precipitation into two liters of methanol; it was filered, washed with methanol, and dried in a vacuum oven at room temperature. The poly(amide acid) had the following properties: Softening point 165°–170° C., intrinsic viscosity in etrahydrofuran = 0.060, acid equivalence: 389 g/mol.

A strapping tape coated with a pressure-sensitive adhesive was prepared as follows: A one/half mil Mylar polyester film was backsized with a 1% toluene solution of the above polymer and primed, all as in Example I. It was then coated on the primed side with 1.0 oz./sq. yd. (dry) adhesive of the following composition and the solvent driven off at 240° F.:

|  | Parts by Weight |
| --- | --- |
| Natural Rubber | 85 |
| Butadiene-Styrene Copolymer | 15 |
| Polyterpene Resins | 80 |
| Alkylated Phenolic Resin | 12.5 |
| Antioxidant | 2 |
| Solvent Mixture (Aliphatic and Aromatic Hydrocarbons) | 580 |

A glass cloth having 100 warp yarns per inch and 8 fill yarns per inch was coated with 3.25 oz./sq. yd. (dry) of the above adhesive and the uncoated side of it was laminated against the mass-coated side of the Mylar film previously prepared. The glass reinforced adhesive material was then slit into 1 × 60 yd. rolls and cycle aged. On testing unwind adhesion was found to be 2.2 lb./in. A tape similarly made but with a commercially available backsize yielded higher than 5 lb./in. unwind adhesion and often delaminated on unwinding.

EXAMPLE IV

N-behenyl trimethylenediamine, 153.8 grams (0.375 mol), was melted in a 3-necked, round bottom flask equipped with an electrical heater, a stirrer, a Dean-Stark condenser and a nitrogen inlet. The diamine was then dissolved in 700 grams of toluene, the temperature raised to 90°–100° C., and 126.8 grams (0.393 mol) of 3,3′,4,4′-benzophenone tetracarboxylic dianhydride were slowly stirred in. The reaction mixture was refluxed under a slow nitrogen stream for ½ hour to yield a viscous solution. The amount of water trapped in the Dean-Stark condenser was about 0.5 ml. 200 Grams of toluene, and 50 grams of N,N′-dimethyl formamide were added which greatly reduced the viscosity. The product was then precipitated in 5 liters of acetone, filtered, washed with acetone and dried in a vacuum oven at 60° C. to yield 251.9 grams (90%) of a polymer having the following properties: Intrinsic viscosity in toluene-N,N-′-dimethylformamide (90:10 by volume): 0.057, acid equivalence: 530 g/mol.

An amine salt solution was formed by dissolving at 60° C. 240 grams of the polymer in 2097 grams of water containing 67 grams of morpholine.

This solution was blended, at the level of 2 and 3 dry parts per 100 dry parts, with a latex blend containing a major amount of polyvinylchloride and a minor amount of nitrile rubber. It was then thickened with sodium polyacrylate to yield a release backsize of 500 cps. viscosity.

A crepe paper having a basis weight of 27 lb. per ream was saturated with an SBR latex to a 50% dry pickup. It was coated with the release backsize at 0.47 oz/sq. yd. (dry) using an air knife, dried at 200° F. and the backsize fused at 350° F.

The backsized sheet was then coated at 1.45 oz/sq. yd. (dry) with the adhesive mass described in Example I, dried at 240° F. and slit to 1 × 60 yd. rolls. A similar tape was prepared by using a typical release agent available commercially. The results are summarized in the following table.

|  | Release Agent of this Example | | Commercial Release Agent | |
| --- | --- | --- | --- | --- |
|  | 2 phr[a] | 3 phr | 2 phr | 5 phr |
| Unwind Adhesion (lbs/in): | | | | |
| Cycle Aging | 0.8 | 0.7 | 1.9 | 1.4 |
| Dry Aging[b] | 0.9 | 0.8 | 2.0 | 1.6 |
| Oxygen Wet Aging[c] | 1.5 | 1.0 | 3.6 | 2.6 |
| Wet Aging[d] | 2.7 | 2.7 | 4.6[e] | 3.9[e] |
| Adhesion to Stainless Steel (oz./in.) | 27 | 27 | 9 | 29 |
| Quickstick (oz./in.) | 10 | 11 | 29 | 10 |

[a]parts dry release agent per 100 dry parts of latex backsize.
[b]150° F. air oven, 6 days.
[c]150° F. oven, 85% R.H., oxygen atmosphere, 20 in. mercury pressure, 16 hours.
[d]100° F., 85% R.H., 6 days.
[e]Delaminations (paper splitting).

EXAMPLE V

A 1.2 mil cellulose acetate film was coated with a laminating cement having the following composition:

|  | Parts by Weight |
| --- | --- |
| Nitrile Rubber | 16.0 |
| Chloroprene | 6.4 |
| Zinc Resinate | 9.6 |
| Toluene | 61.2 |
| Acetone | 6.8 |

After solvent evaporation in a forced air oven, a glass cloth having 32 warp yarns per inch and 8 fill yarns per inch was laminated to it. The film side of the sandwiched cloth was then backsized and dried as in Example I with the release agent, the preparation of which is described in Example IV. The backsize had the following wet composition:

|  | Parts by Weight |
| --- | --- |
| Release Agent | 2 |
| Toluene | 93 |
| N,N-Dimethylformamide | 5 |

The glass cloth side of the laminate was then coated with the following adhesive composition, dispersed in water, and having a total solids content of 45%:

|  | Parts by Weight |
| --- | --- |
| Natural Rubber | 70 |
| Styrene-butadiene rubber | 30 |
| Synthetic Polyterpene | 65 |

-continued

|  | Parts by Weight |
| --- | --- |
| Sulfur Curative | 1 |
| Butyl Zimate | 1 |
| Thickener | 1 |
| Emulsifier | 1 |

The mass coated laminate was then dried in a forced air oven at 240° F. to yield 3.25 oz. of dry mass per square yard of fabric, slit into ¾ × 60 yard rolls and submitted to accelerated aging before testing. The results, which include tapes made in a similar way but backsized with two commercially available release agents are summarized in the following table:

|  | Release Agent of this Example | Commercial Release Agent | |
| --- | --- | --- | --- |
|  |  | A | B |
| Unwind Adhesion, lb./in. | | | |
| Cycle Aging | 2.8 | 9.3 | 8.5 |
| Oxygen - Wet Aging | 3.8 | D* | D* |
| Adhesion to Stainless Steel (TA) Aged, oz./in. | 41 | 40 | 41 |
| Quickstick, (TA) Aged, oz/in. | 20 | 19 | 20 |

*Cannot unwind without delamination (destruction of the sandwich structure) Unwind values higher than 10 lb./in.

EXAMPLES VI AND VII

Toluene, 12,204 grams and N-behenyl trimethylene diamine, 3,860 grams (10 moles), were charged in a steam jacketed reactor equipped with a stirrer, a Dean-Stark condenser, a thermometer, and a vacuum pump. Water was taken off at 200° F, 15 mm Hg. vacuum for 1 hour, and 1,356 grams N,N-dimethylformamide was charged in the reactor. While maintaining the temperature at 200° F., 3,445 grams (10.5 moles) of 3,3',4,4'-benzophenone tetracarboxylic dianhydride was stirred into the reaction mixture over a period of 1/2 hour. The imidization reaction was continued at 200° F, 15 mm Hg. vacuum, by taking off water for the number of hours as specified below, cooling the solution to 130° F., and thinning it by the addition of 1,356 grams of methanol. The polymers which were retrieved by precipitation in acetone and spray drying possessed the following properties:

|  | Ex. VI | Ex. VII |
| --- | --- | --- |
| Reaction Time, hours | 1 | 3.2 |
| Acid Equivalence, g/mole COOH | 483 | 642 |
| Conversion to imide, % | 33 | 72 |
| Intrinsic Viscosity (in Toluene/DMF = 90/10 by weight) | 0.063 | 0.066 |

General purpose pressure-sensitive adhesive tapes were prepared as in Example IV using 2 parts of release agent per 100 parts (dry) of the latex. A similar adhesive tape was prepared by using 5 parts of a commercial release agent per 100 parts (dry) of the latex. The results* are summarized in the following table:

*The measuring units and the aging conditions are the same as the ones described in Example IV.

|  | Release Agent of | | Commercial Release Agent |
| --- | --- | --- | --- |
|  | Ex. VI | Ex. VII |  |
| Unwind Adhesion | | | |
| Cycle Aging | 1.1 | 1.1 | 1.6 |
| Dry Aging | 0.9 | 1.0 | 1.6 |

-continued

|  | Release Agent of | | Commercial Release Agent |
|---|---|---|---|
|  | Ex. VI | Ex. VII |  |
| Oxygen - Wet Aging | 1.4 | 1.4 | 2.3 |
| Wet Aging (3 days) | 1.6 | 1.6 | 2.0 |
| Adhesion to Stainless Steel | 39 | 40 | 38 |
| Quickstick | 23 | 21 | 20 |

*The measuring units and the aging conditions are the same as the ones described in Example IV.

EXAMPLES VIII–X

Three (3) release polymers were prepared and used in pressure-sensitive adhesive tapes, all as in Examples VI and VII. The various dianhydrides and diamines used, the reaction times, the properties of the polymers and the tapes prepared with these polymers are presented in the following tables:

|  | Example* VIII | Example* IX | Example* X | Commercial Rel. Agent |
|---|---|---|---|---|
| Diamine | STD[1] | BTD[2] | BTD |  — |
| Dianhydride | BTDA[3] | PMDA[4] | AGAT[5] | — |
| Reaction Time, hrs. | 3.7 | 1.5 | 2 | — |
| Softening Temp., ° C | 110–115 | 194–202 | 110–115 | 92–97 |
| Acid Equivalence | 608 | — | 821 | 470 |
| Imide, % | 75 | 63 | 84 | — |
| Unwind Adhesion |  |  |  |  |
| Cycle Aging | 1.2 | 1.1 | 1.7 | 1.6 |
| Dry Aging | 1.2 | 0.8 | 1.5 | 1.6 |
| Oxygen-Wet Aging | 1.4 | 1.4 | 2.7 | 2.3 |
| Wet Aging (3 days) | 2.0 | 1.8 | 2.9 | 2.0 |
| Adhesion to Stainless Steel | 40 | 41 | 39 | 38 |
| Quickstick | 22 | 22 | 22 | 20 |

[1]N-Stearyl trimethylene diamine
[2]N-Behenyl trimethylene diamine
[3]Benzophenone tetracarboxylic dianhydride
[4]Pyromellitic dianhydride
[5]4,4'-(2-acetoxy-1,3-glyceryl) bisanhydrotrimellitate *2 phr release agent per 100 parts latex blend (dry). The commercial release agent was 5 phr. blended per 100 parts latex blend (dry).

From the data shown in the examples it is apparent that the release agents of this invention provide very good unwind adhesion while retaining good adhesion and quickstick to a variety of substrates.

The invention has been described herein by reference to certain preferred embodiments. However, as variations thereon will appear to those skilled in the art, the invention is not to be considered as limited thereto. Moreover, although the invention has been more particularly described for use as a release coating for pressure-sensitive adhesive tape, it will be appreciated that it has many other uses including, among other things, use as a water repellant coating in paper, textile, and metal finishing; an internal and external lubricant for plastics; an antiblock and slip agent for inks and coatings; viscosity increaser and pour point depressant in lubricating oils; and wire coatings.

What is claimed is:

1. A polymeric composition suitable as a release agent for pressure-sensitive adhesives comprising the reaction product of a tetracarboxylic dianhydride and an N-fatty diamine having the general recurring formulae:

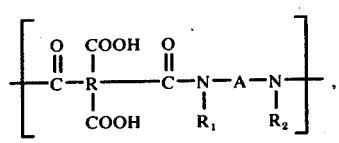

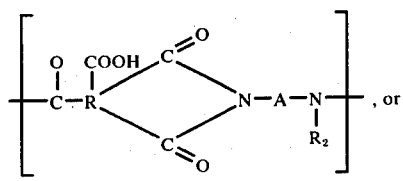

III. mixtures thereof wherein R is a tetravalent radical having at least 4 carbon atoms, and wherein in the dianhydride the four carbonyl groups are attached to separate carbon atoms and each pair of carbonyl groups is directly attached to adjacent nuclear carbon atoms, A is a divalent organic radical having from 2 to 15 carbon atoms, the amino groups in the diamine component being attached to separate carbon atoms, $R_1$ is an alkyl radical having a straight chain containing about 1 to 30 carbon atoms or hydrogen and $R_2$ is an alkyl radical having a straight chain containing about 12 to 30 carbon atoms, the polymer having an intrinsic viscosity of more than about 0.04 up to 0.07 as measured in tetrahydrofuran at 30° C.

2. A composition according to claim 1 wherein R is an organic tetravalent radical containing 4–20 carbon atoms and is selected from the group consisting of aromatic, aliphatic, and combinations of aromatic and aliphatic, radicals.

3. A composition according to claim 2 wherein A is selected from the group consisting of aromatic and aliphatic radicals and combinations of aromatic and aliphatic radicals.

4. A composition according to claim 1 of the following recurring formula:

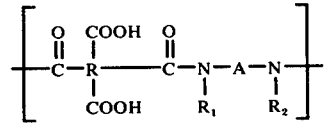

wherein A, R, $R_1$ and $R_2$ are defined as in claim 1.

5. A composition according to claim 1 of the following recurring formula:

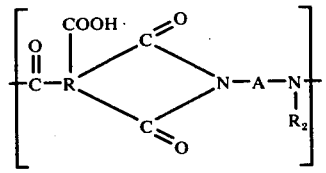

wherein A, R, $R_1$ and $R_2$ are defined as in claim 1.

6. A composition according to claim 1 comprising mixtures of formulae I and II.

7. A composition according to claim 2 wherein R is a tetravalent radical selected from the group consisting of naphthyl, diphenyl, diphenyl sulfonyl, pyrrolidyl, and diphenyl ether.

8. A composition according to claim 6 wherein A is a divalent aliphatic hydrocarbon radical having 2 to about 6 atoms.

9. A composition according to claim 8 wherein $R_1$ is an alkyl radical containing about 1 to 30 carbon atoms and $R_2$ is an alkyl radical containing about 12 to 30 carbon atoms.

10. A composition according to claim 8 wherein $R_1$ is hydrogen and $R_2$ is an alkyl radical containing about 12 to 30 carbon atoms.

11. A composition according to claim 7 wherein the organic tetravalent radical is the diphenyl radical of 3, 3', 4, 4', - benzophenone tetracarboxylic dianhydride.

12. A composition according to claim 10 wherein the divalent aliphatic hydrocarbon radical is the radical of N-behenyl trimethylene diamine, and the intrinsic viscosity of the polymer is 0.067.

13. Release composition comprising as a minor component a polymeric composition of the general recurring formulae

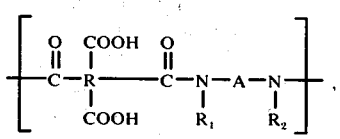   I.

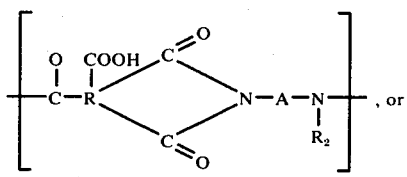   II.

III. mixtures thereof wherein A is a divalent organic radical having from 2 to 15 carbon atoms, R is a tetravalent radical having at least 4 carbon atoms, $R_1$ is an alkyl radical containing about 1 to 30 carbon atoms or hydrogen, and $R_2$ is an alkyl radical containing about 12 to 30 carbon atoms, the polymeric materials having an intrinsic viscosity of more than about 0.04 as measured in tetrahydrofuran at 30° C, and as a major component a latex blend containing a major amount of polyvinylchloride and a minor amount of nitrile rubber.

14. Release composition comprising as a minor component an amine salt of the polymeric composition of claim 8.

* * * * *